US012752854B2

(12) United States Patent
Abe et al.

(10) Patent No.: US 12,752,854 B2
(45) Date of Patent: Oct. 6, 2026

(54) VEHICLE BODY STRUCTURE, AND METHOD FOR DESIGNING VEHICLE BODY STRUCTURE

(71) Applicant: NIPPON STEEL CORPORATION, Tokyo (JP)

(72) Inventors: Masahiko Abe, Tokyo (JP); Atsushi Ono, Tokyo (JP); Shin Toyokawa, Tokyo (JP); Ko Satake, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 227 days.

(21) Appl. No.: 18/836,089

(22) PCT Filed: Feb. 22, 2023

(86) PCT No.: PCT/JP2023/006368
§ 371 (c)(1),
(2) Date: Aug. 6, 2024

(87) PCT Pub. No.: WO2023/189029
PCT Pub. Date: Oct. 5, 2023

(65) Prior Publication Data

US 2025/0153774 A1 May 15, 2025

(30) Foreign Application Priority Data

Mar. 30, 2022 (JP) ................................ 2022-054957
Mar. 30, 2022 (JP) ................................ 2022-054958

(51) Int. Cl.
*B62D 21/15* (2006.01)
*B62D 25/02* (2006.01)
*B62D 25/04* (2006.01)

(52) U.S. Cl.
CPC ......... *B62D 21/157* (2013.01); *B62D 25/025* (2013.01); *B62D 25/04* (2013.01)

(58) Field of Classification Search
None
See application file for complete search history.

(56) References Cited

U.S. PATENT DOCUMENTS

2006/0158008 A1 7/2006 Nagashima
2012/0274099 A1 11/2012 Tamura
2020/0317271 A1 10/2020 Hisada
(Continued)

FOREIGN PATENT DOCUMENTS

CN 211032749 U 7/2020
DE 10 2014 003 378 A1 9/2015
(Continued)

*Primary Examiner* — Nicholas McFall
(74) *Attorney, Agent, or Firm* — Birch, Stewart, Kolasch & Birch, LLP

(57) ABSTRACT

A vehicle body 1 includes a center pillar 4 and a side sill 5. A front portion **5*a* and a rear portion 5*b* of the side sill 5 are restricted from moving inward in a width direction at a front restricting position X2F and a rear restricting position X2R, respectively. The center pillar 4 includes an overlapping portion 22 that covers an external surface of the side sill 5. A center position of the center pillar 4 is specified as X0, a front end position of the overlapping portion 22 from the center position X0 is specified as X1F, and a distance from the center position X0 to the front restricting position X2F is specified as L0. A distance from the center position X0 to the end portion position X1F is specified as L1. A ratio L1/L0 between the distances is 0.36≤L1/L0**≤0.48.

6 Claims, 8 Drawing Sheets

(56) References Cited

U.S. PATENT DOCUMENTS

| | | | |
|---|---|---|---|
| 2022/0169319 | A1 | 6/2022 | Ookubo |
| 2022/0297759 | A1 | 9/2022 | Nagahama et al. |
| 2024/0109593 | A1 | 4/2024 | Sharma |

FOREIGN PATENT DOCUMENTS

| | | | |
|---|---|---|---|
| JP | 7-116747 | A | 5/1995 |
| JP | 2001-294178 | A | 10/2001 |
| JP | 2003-220969 | A | 8/2003 |
| JP | 2003-306165 | A | 10/2003 |
| JP | 2009-101794 | A | 5/2009 |
| JP | 2012-20586 | A | 2/2012 |
| JP | 2016-193709 | A | 11/2016 |
| WO | WO 2011/077840 | A1 | 6/2011 |
| WO | WO 2020/194014 | A1 | 10/2020 |
| WO | WO 2021/065301 | A1 | 4/2021 |

VEHICLE BODY STRUCTURE, AND METHOD FOR DESIGNING VEHICLE BODY STRUCTURE

TECHNICAL FIELD

The present invention relates to a vehicle body structure and a method for designing the vehicle body structure.

BACKGROUND ART

A vehicle body of a passenger car, which is a type of a vehicle, usually includes a center pillar arranged along the vertical direction of the vehicle body, and a side sill that is connected to a lower portion of the center pillar and is arranged along the front and rear direction of the vehicle body (for example, refer to Patent Documents 1 and 2). The lower portion of the center pillar and the side sill are firmly fixed to each other by welding or the like. Then, when the passenger car has a side collision, the center pillar and the side sill work together to receive impact loads, thereby absorbing the impact and protecting occupants in a cabin.

LIST OF PRIOR ART DOCUMENTS

Patent Document

Patent Document 1: JP2001-294178A
Patent Document 2: JP2009-101794A

SUMMARY OF INVENTION

Technical Problem

The smaller the amount of deformation that deforms a vehicle body toward a cabin at the time of a side collision, the higher the occupant protection performance. In order to make this amount of deformation small, it is better to have a higher coupling strength between the center pillar and the side sill. As a method of increasing this coupling strength, it is conceivable to form a center pillar lower portion to be long in the front and rear direction so as to increase the area where this lower portion and the side sill overlap with each other. However, in order to increase this overlapping area, it is necessary to make the center pillar lower portion into a large shape, and the weight of the center pillar is increased. In recent years, since there has been a strong demand to make the vehicle body as light as possible, it is desired to avoid increasing the weight of the center pillar as much as possible.

However, in each of the configurations described in Patent Documents 1 and 2, it cannot be said that special consideration has been given to the balance between the side collision performance and the center pillar weight for the front and rear direction length of the center pillar lower portion.

One of the objectives of the present invention is to provide a lighter-weight vehicle body structure while achieving a high anti-side impact performance.

Solution to Problem

The gist of the present invention is the following vehicle body structure.

(1) A vehicle body structure, including:

a center pillar arranged along a vertical direction of a vehicle body; and a side sill that is connected to a lower portion of the center pillar, and that is arranged along a front and rear direction of the vehicle body, wherein the side sill has a closed cross-sectional shape including an upper surface, an outer surface arranged below the upper surface and faces outward in a width direction of the vehicle body, and a bottom surface arranged below the outer surface, a front portion and a rear portion of the side sill are regulated from being moved inward in the width direction of the vehicle body at a front restricting position and a rear restricting position by mating members included in the vehicle body, respectively, at least one of the front restricting position and the rear restricting position is specified as a predetermined restricting position X2, the center pillar includes an overlapping portion arranged so as to cover an external surface of the side sill at a portion connected to the side sill, and a center position of the center pillar in the front and rear direction at a height position of the upper surface is specified as X0, an end portion position in the front and rear direction of the overlapping portion arranged between the center position X0 and the predetermined restricting position X2 is specified as X1, a distance in the front and rear direction from the center position X0 to the predetermined restricting position X2 is specified as L0, and a distance in the front and rear direction from the center position X0 to the end portion position X1 is specified as L1, and a ratio L1/L0 between the distances is $0.36 \leq L1/L0 \leq 0.48$.

(2) The vehicle body structure according to the aforementioned (1), wherein the overlapping portion includes a front end and a rear end, and in the front and rear direction, a distance from the center position X0 to a position of the front end of the overlapping portion and a distance from the center position X0 to a position of the rear end of the overlapping portion are substantially the same.

(3) The vehicle body structure according to the aforementioned (1) or the aforementioned (2), wherein at least one of a front portion of the overlapping portion located in front of the center position X0, and a rear portion of the overlapping portion located behind the center position X0 is arranged so as to overlap with a position of a floor cross member of the vehicle body in the front and rear direction.

(4) The vehicle body structure according to any one of the aforementioned (1) to (3), wherein a thickness of the side sill is less than a thickness of the overlapping portion of the center pillar.

(5) A method for designing a vehicle body structure, the vehicle body structure including:

a side sill arranged along a front and rear direction of a vehicle body; and a center pillar arranged along a vertical direction of the vehicle body, the center pillar including an overlapping portion arranged so as to cover an external surface of the side sill at a portion connected to the side sill, the method including:

a positioning step for determining an end portion position of the overlapping portion in the front and rear direction, wherein in the positioning step, a side collision test for the center pillar and the side sill is performed, and the end portion position is determined on the basis of a result of the side collision and a weight of the center pillar according to the end portion position of the overlapping portion.

(6) The method for designing a vehicle body structure according to the aforementioned (5), wherein the center pillar includes an upper portion arranged above the overlapping portion, the side sill is restricted from moving inward in a width direction of the vehicle body at a predetermined restricting position X2 by a mating member included in the vehicle body at a position advanced from the upper portion toward an end portion position X1, and in the positioning step, the end portion position X1 is determined on the basis of the result of the side collision and the weight of the center pillar with respect to a ratio L1/L0 between a distance L0 from a center position X0 set to the overlapping portion below the upper portion to the restricted position X2 and a distance L1 from the center position X0 to the end portion position X1.

Advantageous Effects of Invention

According to the present invention, a lighter-weight vehicle body structure can be realized while achieving a high anti-side collision performance.

DESCRIPTION OF EMBODIMENTS

Figure 1:
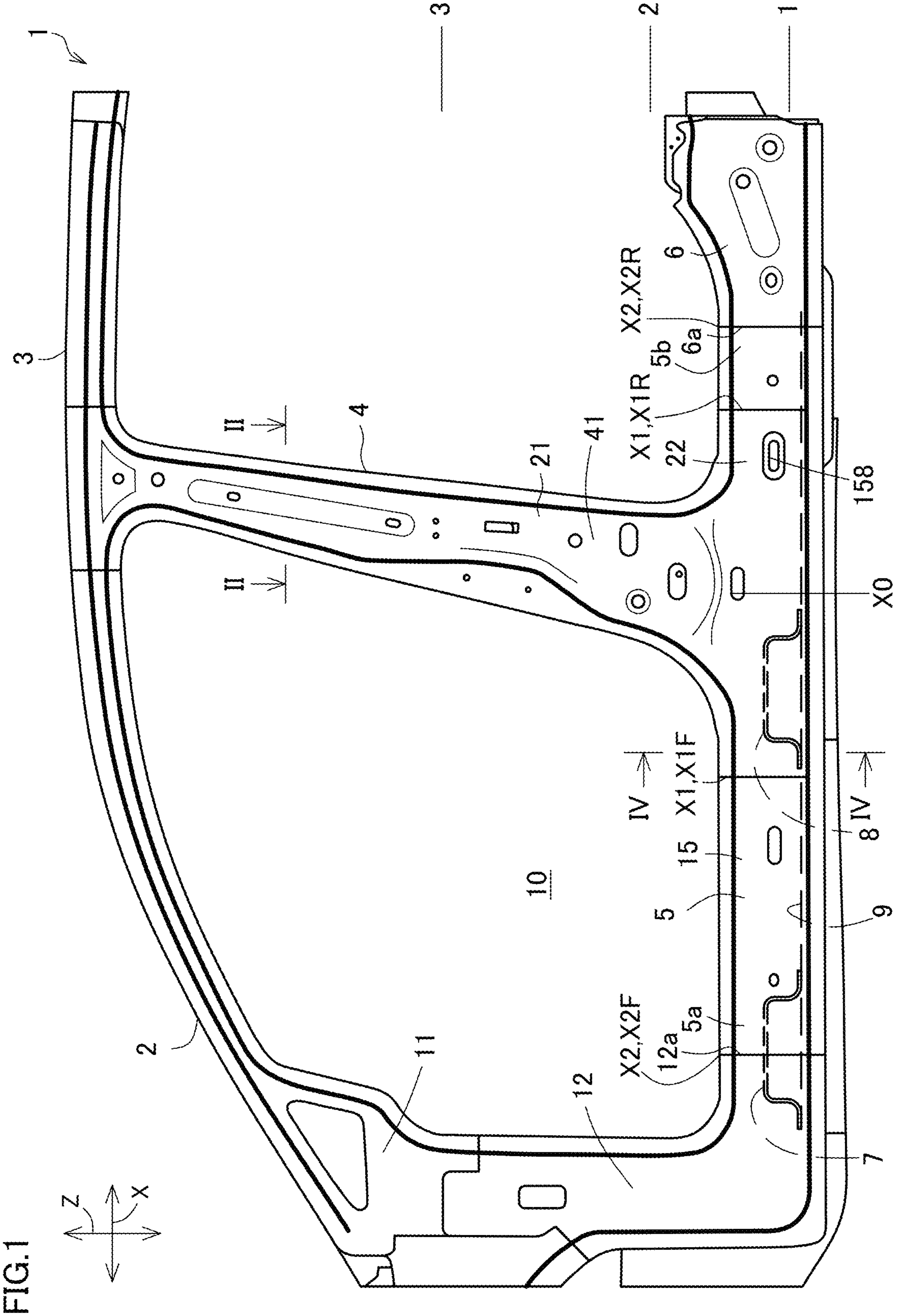
FIG. 1 is a schematic left side view illustrating a main portion of a vehicle body to which a vehicle body structure according to one embodiment of the present invention is applied.

<How we Arrived at the Present Invention>

In order to realize a lighter-weight vehicle body structure while achieving a high anti-side impact performance, the present inventors focused on the combined structure between a center pillar and a side sill. Specifically, the focus was put on the fact that the amount of intrusion of the side sill and the center pillar toward the inside in a vehicle width direction at a side collision of an automobile is subject to the following two kinds of influence (a) and (b).

(a) When a center pillar lower end is located at a top plate portion (an upward facing plate-like portion) of a side sill outer, at the time of a side collision, load is applied to the side sill so as to crush a closed cross-sectional shape of the side sill by the load transmitted from the center pillar. Since the closed cross-sectional shape portion (particularly, the side sill outer portion) of the side sill is crushed by this load, the torsional rigidity of a side sill cross-section is decreased, and thus the torsion angle of the side sill is increased. With the increase in the torsion angle of the side sill, the rotation angle (the rotation amount of a center pillar lower portion when seen from a front and rear direction) of the center pillar lower portion is also increased, and thus the amount of intrusion of the entire center pillar toward a cabin side is increased.

(b) A torsion moment is input to a portion of the side sill that is not overlapped with the center pillar at the time of the side collision. Therefore, a shear load is input to the top plate portion of the side sill by the side collision. Since the shear load to be input is increased in a late stage of the collision, shear buckling occurs in the top plate portion of the side sill. Accordingly, the torsion rigidity of the side sill in a side sill cross-section (a cross-section perpendicular to the front and rear direction) is decreased, and the torsion angle of the side sill is increased. With the increase in the torsion angle of the side sill, the rotation angle of the center pillar lower portion is also increased. As a result, the amount of intrusion of the entire center pillar toward the cabin side is increased.

The present inventors conducted extensive studies on the basis of the findings (a) and (b) described above, and came to the conclusion that a lighter-weight vehicle body structure can be realized while achieving a high anti-side collision performance, by improving at least one of (1) and (2) described below.

(1) When the center pillar holds as far as a lower portion of a side sill, the load transmitted from the center pillar to the side sill at the time of a side collision acts on the side sill as a torsion moment. Therefore, it is possible to suppress the occurrence of crushing of the closed cross-sectional shape of the side sill. Since the original closed cross-sectional shape of the side sill can be kept at a high level through the collision process of a side collision, the side sill has a high torsional rigidity, and the torsion angle of the side sill at the time of the side collision can be reduced. Accordingly, the amount of intrusion of the side sill into the cabin can be reduced. On the other hand, by devising the arrangement such that the center pillar does not reach as far as the lower end of the side sill, the center pillar does not become heavier than necessary, and it is possible to highly balance the improvement in the reinforcement effect of the side sill by the center pillar lower portion and the suppression of increase in the weight of the center pillar.

(2) By increasing the length (overlap allowance) of an overlapping portion in the vehicle front and rear direction between the center pillar lower portion and the side sill, since the center pillar and the side sill are integrally rotated (rotation seen from the front and rear direction) in the overlapping portion at the time of a side collision, a torsion moment is not input to the side sill, and shear buckling of the side sill top plate portion does not occur. Further, since the torsional rigidity becomes high since the center pillar lower portion and the side sill are overlapped, the torsion angle of the side sill can be reduced. Additionally, even if a portion of the side sill that is not overlapped with the center pillar lower portion is buckled, since the length of the portion in a longitudinal direction is decreased, the rotation angle (the rotation angle of the rotation seen from the front and rear direction) of the center pillar lower portion (that is a product of the torsion angle per unit length and the length in the longitudinal direction) is decreased. Therefore, the amount of intrusion of the side sill toward the cabin side at the time of a side collision can be reduced. On the other hand, by devising the length of the overlapping portion in the front and rear direction between the center pillar lower portion and the side sill to be a proper length, the center pillar does not become heavier than necessary, and it is possible to highly balance the improvement in the reinforcement effect of the side sill by the center pillar lower portion and the suppression of increase in the weight of the center pillar.

By applying the ideas described in the aforementioned (1) and (2), the torsion angle of the side sill at the time of a side collision is decreased, and the amount of intrusion of the side sill toward the cabin can be suppressed at a high mass efficiency. Note that it is sufficient that at least one of the idea described in the aforementioned (1) and the idea described in the aforementioned (2) is applied, and when both are applied, a higher anti-side collision performance can be realized while reducing the increase in vehicle body weight.

DESCRIPTION OF EMBODIMENT

Hereinafter, an embodiment of the present invention will be described with reference to the drawings. In the present embodiment, a vehicle body structure to be applied to an automobile will be described.

Figure 2:
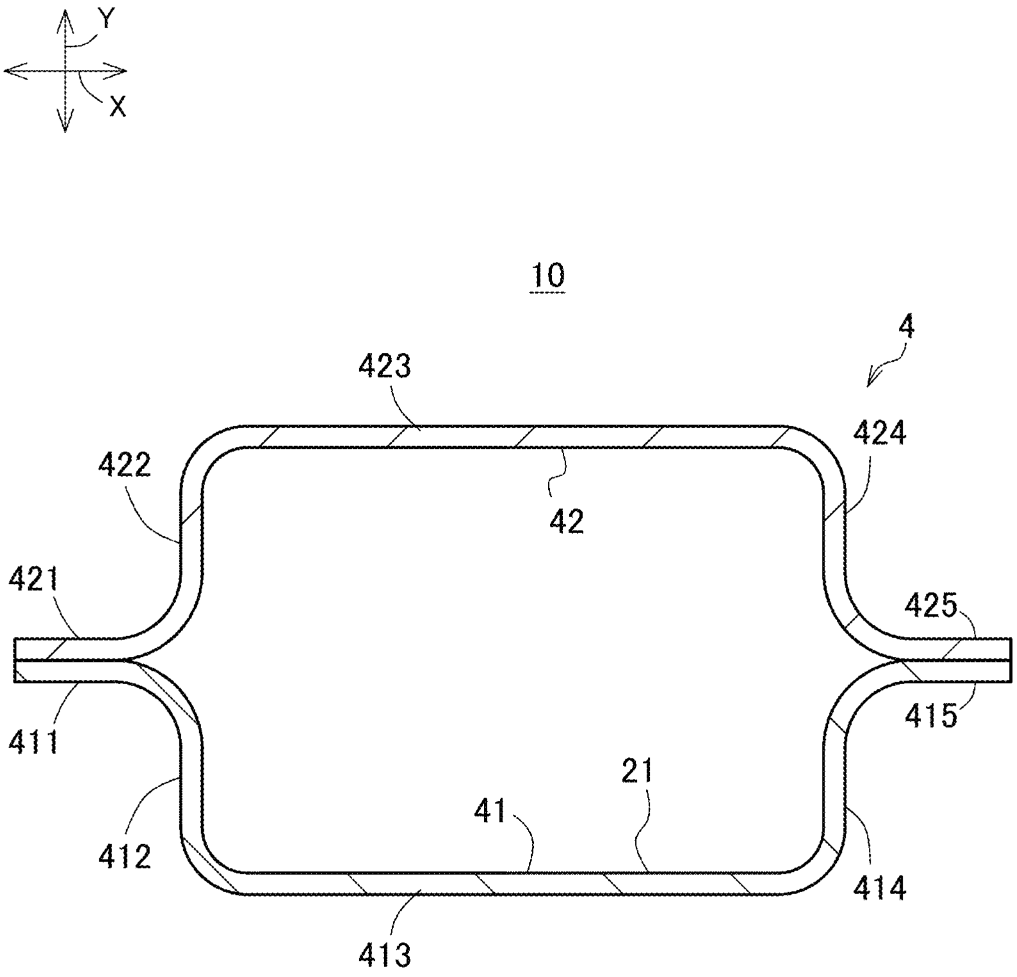
FIG. 2 is a cross-sectional view of an upper portion of a center pillar perpendicular to a vertical direction, taken along line II-II in FIG. 1, and the illustration of an inner depth side of a cross-section is omitted.
Figure 3:
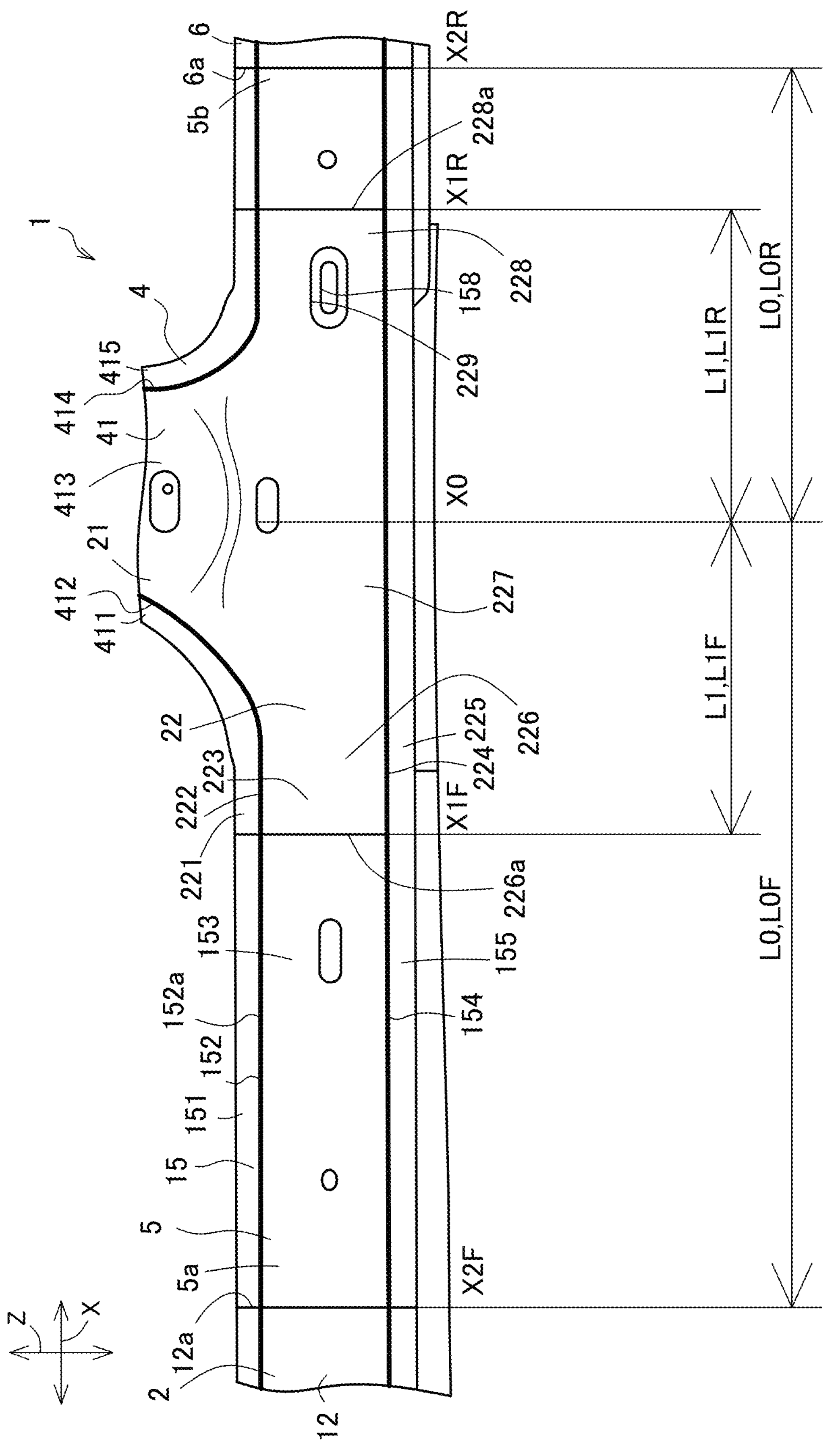
FIG. 3 is an enlarged view for describing a combined state between a side sill outer and a pillar inner in FIG. 1.
Figure 4:
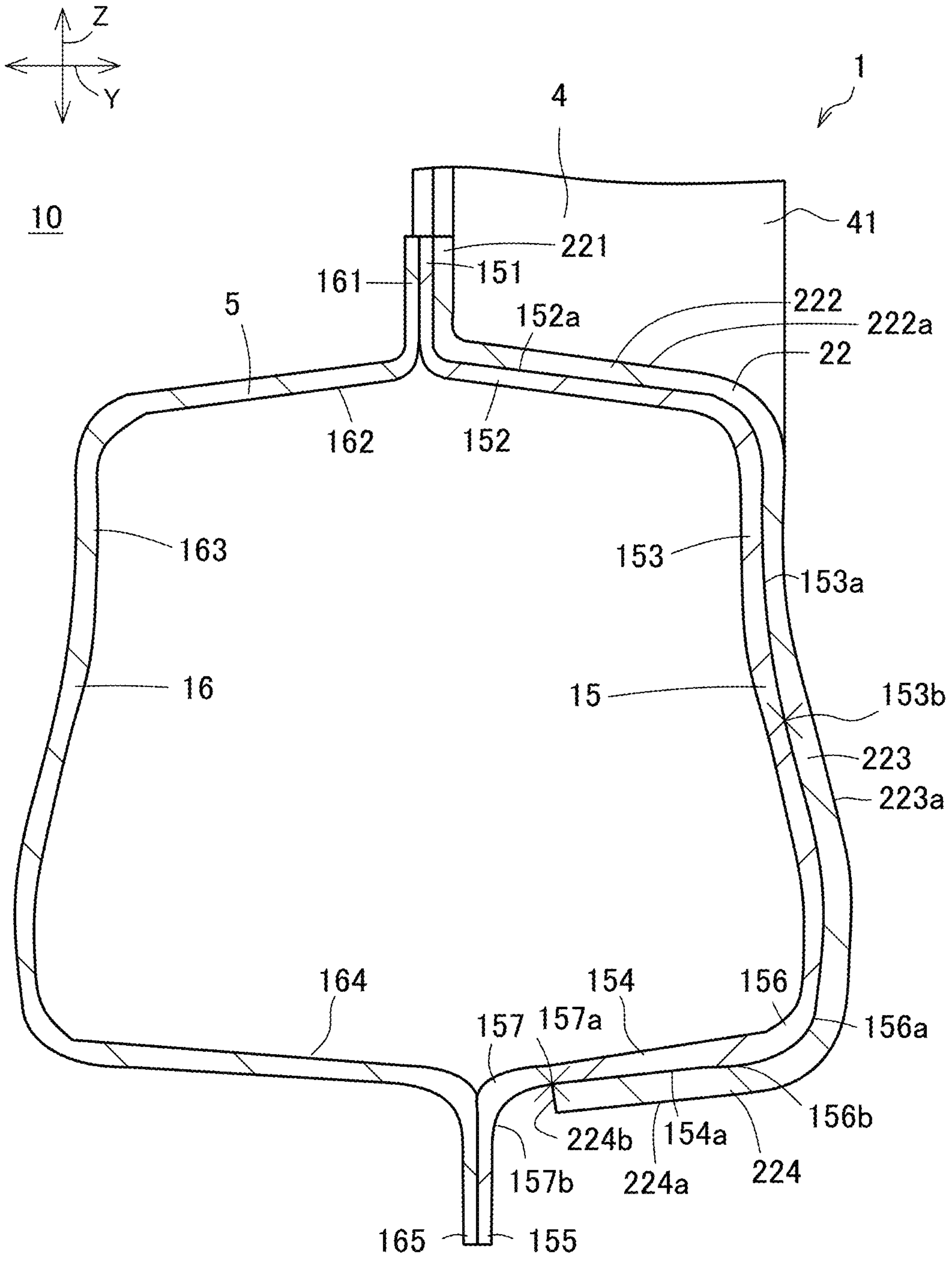
FIG. 4 is a schematic cross-sectional view of a main portion for describing the combined state between the side sill outer and the pillar inner of the center pillar, taken along line IV-IV in FIG. 1, and illustrates a cross-section perpendicular to a front and rear direction.

FIG. 1 is a schematic left side view illustrating a main portion of a vehicle body 1 to which a vehicle body structure according to one embodiment of the present invention is applied. FIG. 2 is a cross-sectional view of an upper portion 21 of a center pillar 4 perpendicular to a vertical direction Z, taken along line II-II in FIG. 1, and the illustration of an inner depth side of a cross-section is omitted. FIG. 3 is an enlarged view for describing a combined state between a side sill outer 15 and a pillar inner 42 in FIG. 1. FIG. 4 is a schematic cross-sectional view of a main portion for describing the combined state between the side sill outer 15 and the pillar inner 42 of the center pillar 4, taken along line IV-IV in FIG. 1, and illustrates a cross-section perpendicular to a front and rear direction X. Hereinafter, unless otherwise specified, a description will be given with reference to FIG. 1 to FIG. 4 as appropriate.

The vehicle body 1 is a part of a vehicle, and an automobile can be listed as the vehicle. A passenger car can be listed as an example of the automobile. As an example of the passenger car, a sedan-type passenger car, a coupe-type passenger car, a hatchback-type passenger car, a minivan-type passenger car, an SUV (Sport Utility Vehicle)-type passenger car, or the like can be listed.

In the present embodiment, the vehicle body 1 is formed by using a steel sheet that has a predetermined thickness.

The vehicle body 1 includes a front pillar 2, a roof pillar 3, the center pillar 4, a side sill 5, a side sill rear 6, floor cross members 7 and 8, and a floor panel 9.

In the front pillar 2, the cross-sectional shape in a cross-section perpendicular to the longitudinal direction of the front pillar 2 is formed into a closed shape (closed cross-sectional shape) such as a rectangle. The front pillar 2 includes a pillar upper 11 that extends toward the rear as it extends upward and that is coupled to the roof pillar 3, and a pillar lower 12 arranged under the pillar upper 11. The pillar lower 12 is formed into, for example, an L-shaped when viewed in a side view. A lower rear end edge 12*a* of the pillar lower 12 is opened toward the rear.

The roof pillar 3 is arranged at a roof portion of the vehicle body 1, and extends toward the rear from the pillar upper 11.

The side sill 5 is provided in a lower portion of an outer portion of the vehicle body 1 in a vehicle width direction Y. The side sill 5 is connected to a lower portion of the center pillar 4, and is arranged along a front and rear direction X of the vehicle body 1. The side sill 5 forms an endless closed cross-sectional shape in a cross-section perpendicular to the front and rear direction X.

The side sill 5 includes the side sill outer 15 and a side sill inner 16 that are aligned in the vehicle width direction Y.

In each of the side sill outer 15 and the side sill inner 16, the cross-sectional shape perpendicular to the front and rear direction X is formed into a hat shape, and the side sill outer 15 and the side sill inner 16 cooperate to form the closed cross-sectional shape in the side sill 5. The side sill outer 15 is arranged on an outer side in the vehicle width direction Y with respect to the side sill inner 16.

Although the side sill outer 15 and the side sill inner 16 may not have the same thickness, it is preferable that the side sill outer 15 and the side sill inner 16 have the same thickness as in the present embodiment. The side sill outer 15 and the side sill inner 16 are formed of steel sheets. It is preferable that the thickness of each of these side sill outer 15 and side sill inner 16, that is, the thickness of the side sill 5, is set to, for example, 0.80 mm to 1.60 mm. The lower limit of the thickness of the side sill 5 may be 0.80 mm, may be 1.00 mm, or may be 1.20 mm. Additionally, the upper limit of the thickness of the side sill 5 may be a value larger than 1.60 mm, may be 1.60 mm, may be 1.45 mm, or may be 1.40 mm. By setting the thickness of the side sill 5 within the limits described above, the weight of the side sill 5 can be prevented from being excessively large, while sufficiently securing the strength of the side sill 5 at the time of a side collision. Although the tensile strengths of the side sill outer 15 and the side sill inner 16 are not particularly limited, examples include values of 980 MPa or more.

The side sill outer 15 includes an upper flange 151, an upper wall 152 extending outward in the vehicle width direction Y from the upper flange 151, a side wall 153 extending downward from the upper wall 152, a lower wall 154 extending inward in the vehicle width direction Y from the side wall 153, and a lower flange 155 extending downward from the lower wall 154.

The upper wall 152 of the side sill outer 15 includes an upper surface 152*a* as an external surface facing upward. Additionally, the side wall 153 of the side sill outer 15 is arranged in an orientation along the vertical direction Z, and includes an outer surface 153*a* as an external surface facing outward in the vehicle width direction Y. From a viewpoint of the anti-side collision performance, there is no significant difference in the length of the side wall 153 of the side sill outer 15 in the vertical direction Z between vehicles in the A-segment, which is a relatively small vehicle type, and vehicles in the E-segment, which is a relatively large vehicle type, and SUV vehicles. Additionally, the lower wall 154 of the side sill outer 15 includes a bottom surface 154*a*, which is arranged below the outer surface 153*a* of the side wall 153, and is an external surface in an orientation facing the ground. Further, the lower flange 155 of the side sill outer 15 projects downward from the bottom surface 154*a* of the lower wall 154.

The side wall 153 and the lower wall 154 are connected to each other via an R portion 156. The R portion 156 is formed into a curved shape that has the center in the space surrounded by the side sill 5 in a cross-section perpendicular to the front and rear direction X. The R portion 156 is a part of the side wall 153, and is also a part of the lower wall 154. In a cross-section perpendicular to the front and rear direction X, a portion of the side wall 153 other than the R portion 156 extends substantially linearly upward from the upper end 156*a* of the R portion 156. Additionally, in a cross-section perpendicular to the front and rear direction X, a portion of the lower wall 154 other than the R portion 156 extends substantially linearly inward in the vehicle width direction Y from a lower end 156*b* of R portion 156.

The lower wall 154 and the lower flange 155 are connected to each other via an R portion 157. The R portion 157 is formed into a curved shape that has the center outside the space surrounded by the side sill 5 in a cross-section perpendicular to the front and rear direction X. The R portion 157 is a part of the lower wall 154, and is also a part of the lower flange 155. In the cross-section perpendicular to the front and rear direction X, a portion of the lower wall 154 other than the R portion 157 extends substantially linearly outward in the vehicle width direction Y from an upper end 157*a* of the R portion 157. Additionally, in a cross-section perpendicular to the front and rear direction X, a portion of the lower flange 155 other than the R portion 157 extends substantially linearly downward from a lower end 157*b* of the R portion 157.

The upper wall 152 may be horizontal, or may be formed into an inclined shape that extends downward as it extends outward in the vehicle width direction Y. Similarly, the lower wall 154 may be horizontal, or may be formed into an inclined shape that extends upward as it extends outward in the vehicle width direction Y.

The side sill inner 16 includes an upper flange 161, an upper wall 162 extending inward in the vehicle width direction Y from the upper flange 161, a side wall 163 extending downward from the upper wall 162, a lower wall 164 extending outward in the vehicle width direction Y from the side wall 163, and a lower flange 165 extending downward from the lower wall 164.

The upper wall 162 may be horizontal, or may be formed into an inclined shape that extends downward as it extends outward in the vehicle width direction Y. Similarly, the lower wall 164 may be horizontal, or may be formed into an inclined shape that extends upward as it extends outward in the vehicle width direction Y.

The upper flanges 151 and 161 are coupled to each other by welding, adhesion, or the like. Similarly, the lower flanges 155 and 165 are coupled to each other by welding, adhesion, or the like. The floor cross members 7 and 8 extend inward in the vehicle width direction Y from the side sill inner 16.

The floor cross members 7 and 8 are arranged on, for example, a front seat side of a vehicle room (cabin 10) formed by the vehicle body 1. The floor cross members 7 and 8 are arranged spaced apart in the front and rear direction X, and the floor cross member 8 is arranged behind the floor cross member 7. In each of the floor cross members 7 and 8, the cross-sectional shape perpendicular to the vehicle width direction Y is a hat shape, and the floor cross members 7 and 8 cooperate with the floor panel 9 to form closed cross-sectional shapes. The floor panel 9 forms a bottom of the cabin 10 of the vehicle body 1, and the floor cross members 7 and 8 are fixed to the floor panel 9.

A slide rail (not illustrated) is installed on the floor cross members 7 and 8. The slide rail supports a sheet (not illustrated) on which an occupant sits.

A front portion 5*a* of the side sill 5 is fitted to the pillar lower 12 of the front pillar 2, and is fixed to this pillar lower 12 by welding, an adhesives, or the like. Then, the side sill 5 extends rearward from the lower rear end edge 12*a* of the pillar lower 12. The lower rear end edge 12*a* of the pillar lower 12 is opened toward the rear, and is located on a flat surface perpendicular to the front and rear direction X in the present embodiment. Additionally, a rear portion 5*b* of the side sill 5 is fitted to the side sill rear 6, and is fixed to this side sill rear 6 by welding, an adhesive, or the like.

The side sill rear 6 is arranged behind the side sill 5. The side sill rear 6 is a hollow-shell member extending along the front and rear direction X. In the side sill rear 6, the cross-sectional shape in a cross section perpendicular to the longitudinal direction of the side sill rear 6 is formed into a closed shape (closed cross-sectional shape), such as a rectangle. A front end edge 6*a* of the side sill rear 6 is opened toward the front, and is located on a flat surface perpendicular to the front and rear direction X in the present embodiment. The side sill 5 extends forward from the front end edge 6*a* of the side sill rear 6.

With the aforementioned configuration, the front portion 5*a* and the rear portion 5*b* of the side sill 5 are regulated from being moved inward in the vehicle width direction Y at a front restricting position X2 (X2F) and a rear restricting position X2 (X2R) by the pillar lower 12 as a mating member and the side sill rear 6 as a mating member, respectively.

When an object collides with the side sill 5 from the side, particularly, when a side collision occurs in an overlapping portion 22 between the center pillar 4 and the side sill 5, the side sill 5 receives the impact load from the object with the lower rear end edge 12*a* of the front pillar 2 serving as the front restricting position X2 (X2F), the overlapping portion 22 of the center pillar 4 serving as a middle restricting position, and the front end edge 6*a* of the side sill rear 6 serving as the rear restricting position X2 (X2R). Then, when the impact load is a constant value or more, the side sill 5 absorbs the impact load while plastically deforming inward in the width direction Y.

Note that, in the present embodiment, the side sill rear 6 is described as a member forming the rear restricting position X2 (X2R). However, this need not be the case. For example, other members, such as a lower end portion of a C pillar connected to the rear end of the side sill 5, may form the rear restricting position X2 (X2R). Examples of the other members in this case include, for example, a foil house inner, a rear floor panel, and a rear cross member. It is sufficient that the rear restricting position X2 (X2R) is a rear-side restraining point at the time when the side sill 5 is plastically deformed upon reception of the impact load at the time of a side collision, and the specific example of the member forming the rear restricting position X2 (X2R) is not limited. Similarly, for the front restricting position X2 (X2F), the specific example of the member forming the front restricting position X2 (X2F) is not limited.

The center pillar 4 is arranged behind the front pillar 2, and is arranged along the vertical direction Z from the roof pillar 3 to the side sill 5.

The center pillar 4 includes the upper portion 21 arranged above the side sill 5, and the overlapping portion 22 that is arranged under the upper portion 21, and that is arranged to cover an external surface of the side sill 5 at a portion connected to the side sill 5.

Additionally, the center pillar 4 includes a pillar outer 41 and a pillar inner 42 that are aligned in the vehicle width direction Y, and the upper portion 21 and the overlapping portion 22 are formed by these pillar outer 41 and pillar inner 42. In each of the pillar outer 41 and the pillar inner 42, the upper portion 21 and the overlapping portion 22 may be integrally molded. For example, the integral molding in this case refers to that, in each of the pillar outer 41 and the pillar inner 42, the portions that serve as the upper portion 21 and the overlapping portion 22 are molded as a single member at the time of molding of a starting material (blank), and there is no seam between the portions that serve as the upper portion 21 and the overlapping portion 22. Note that, in the integral molding in this case, the starting material is a tailored blank, such as a steel sheet or an aluminum board, for each of the pillar outer 41 and the pillar inner 42, and the integral molding in this case also includes a configuration in which respective edge portions of the portion that serves as the upper portion 21 and the portion that serves as the overlapping portion 22 are coupled to each other by welding or the like.

The center pillar 4 may have a constant thickness, or may be formed by press-molding a tailored blank that has different thicknesses depending on location. When the center pillar 4 is formed from the tailored blank, examples of the configuration include, for example, a configuration in which the thickness of an intermediate portion of the upper portion 21 of the center pillar 4 in the vertical direction Z is larger than the thickness of the other portions of the center pillar 4.

The center pillar 4 is formed of a steel sheet. Although the thickness of the upper portion 21 of the center pillar 4 is not particularly limited, examples include about 0.80 mm to 2.50 mm. Note that, since the thickness of the upper portion 21 does not have large influence on the amount of intrusion of the side sill 5 into the cabin 10 at the time of a side collision, it is not particularly limited in the present embodiment.

It is preferable that the thickness of the overlapping portion 22 is set to, for example, 0.80 mm to 2.00 mm. The lower limit of the thickness of the overlapping portion 22 may be 0.80 mm, may be 1.00 mm, or may be 1.20 mm. Additionally, the upper limit of the thickness of the overlapping portion 22 may be a value larger than 2.00 mm, may be 1.80 mm, may be 1.60 mm, may be 1.45 mm, or may be 1.40 mm. By setting the thickness of the overlapping portion 22 within the limits described above, the weight of the overlapping portion 22 can be prevented from being excessively large, while sufficiently securing the strength of the overlapping portion 22 at the time of a side collision. Note that while the thickness of the overlapping portion 22 has large influence on the amount of intrusion of the side sill 5 into the cabin 10 at the time of a side collision, the thickness of the upper portion 21 does not have much influence on the amount of intrusion of the side sill 5 into the cabin 10 at the time of the side collision. Although the tensile strength of the center pillar 4 is not particularly limited, examples include values of 980 MPa or more.

It is preferable that the thickness of the side sill 5 is less than the thickness of the overlapping portion 22 of the center pillar 4. With this configuration, the amount of intrusion of the side sill 5 into the cabin at the time of a side collision can be reduced by the reinforcement effect of the overlapping portion 22, while reducing the amount of the side sill 5.

In the upper portion 21, in each of the pillar outer 41 and the pillar inner 42, the cross-sectional shape perpendicular to the vertical direction Z is formed into a hat shape, and the pillar outer 41 and the pillar inner 42 form a closed cross-sectional shape in the center pillar 4. The pillar outer 41 is arranged outward in the vehicle width direction Y with respect to the pillar inner 42.

The pillar outer 41 in the upper portion 21 includes a front flange 411, a front wall 412 extending outward in the vehicle width direction Y from the front flange 411, a side wall 413 extending rearward from the front wall 412, a rear wall 414 extending inward in the vehicle width direction Y from the side wall 413, and a rear flange 415 extending rearward from the rear wall 414.

The pillar inner 42 in the upper portion 21 includes a front flange 421, a front wall 422 extending inward in the vehicle width direction Y from the front flange 421, a side wall 423 extending rearward from the front wall 422, a rear wall 424 extending outward in the vehicle width direction Y from the side wall 423, and a rear flange 425 extending rearward from the rear wall 424.

The front flanges 411 and 421 are coupled to each other by welding, adhesion, or the like. Similarly, the rear flanges 415 and 425 are coupled to each other by welding, adhesion, or the like.

Next, the configuration of the overlapping portion 22 will be described more specifically.

The pillar inner 42 in the overlapping portion 22 is fixed to the side sill inner 16 by welding, an adhesive, or the like.

The pillar outer 41 in the overlapping portion 22 is also simply referred to as the overlapping portion 22 in the present embodiment.

The overlapping portion 22 is arranged such that the external surface of the side sill 5 is covered from the outer side in the width direction Y at a portion of the pillar outer 41 of the center pillar 4 connected to the side sill 5.

The overlapping portion 22 includes an upper flange 221, an upper wall 222 extending outward in the vehicle width direction Y from the upper flange 221, a side wall 223 extending downward from the upper wall 222, and a lower wall 224 extending inward in the vehicle width direction Y from the side wall 223.

The upper wall 222 may be horizontal, or may be formed into an inclined shape that extends downward as it extends outward in the vehicle width direction Y. Similarly, the lower wall 224 may be horizontal, or may be formed into an inclined shape that extends upward as it extends outward in the vehicle width direction Y. The side wall 223 may be perpendicular, or may be inclined with respect to the vertical direction Z.

The upper flange 221 is fixed to the upper flange 151 of the side sill outer 15 by welding, an adhesive, or the like.

It is preferable that an inner surface (bottom surface) of the upper wall 222 extends along and contacts the upper surface 152*a* of the upper wall 152 of the side sill outer 15, and the inner surface (bottom surface) of the upper wall 222 may or may not be fixed to this upper surface 152*a* by welding, an adhesive, or the like. Note that the inner surface of the upper wall 222 may not contact the upper surface 152*a* of the upper wall 152 of the side sill outer 15.

It is preferable that the inner surface of the side wall 223 extends along and contacts the outer surface 153*a* of the side wall 153 of the side sill outer 15, and the inner surface of the side wall 223 may or may not be fixed to this outer surface 153*a* by welding, an adhesives, or the like. Note that the inner surface of the side wall 223 may not contact the outer surface 153*a* of the side wall 153 of the side sill outer 15.

It is preferable that the inner surface of the lower wall 224 extends along and contacts the bottom surface 154*a* of the lower wall 154 of the side sill outer 15, and the inner surface of the lower wall 224 is fixed to this bottom surface 154*a* by welding, an adhesive, or the like. In the present embodiment, a lower end 224*b* (lower front end) of the lower wall 224 is a lower end of the overlapping portion 22, and the inner surface of the lower wall 224 extends along the bottom surface 154*a* of the lower wall 154 of the side sill outer 15.

In this manner, the lower end 224*b* of the overlapping portion 22 extends along the bottom surface 154*a* of the lower wall 154 of the side sill outer 15. That is, the center pillar 4 is configured to hold as far as the lower wall 154, which is a lower portion of the side sill 5. Accordingly, the load transmitted from the center pillar 4 to the side sill 5 at the time of a side collision can be received by the vehicle body 1 as a torsion moment. Therefore, it is possible to suppress the occurrence of collapse in the closed cross-sectional shape of the side sill 5, particularly, in the side sill outer 15. Since the original closed cross-sectional shape of the side sill 5 before collision can be kept at a high level through the collision process of a side collision, the side sill 5 has a high torsional rigidity, and the torsion angle of the side sill 5 at the time of the side collision can be reduced. Accordingly, the amount of intrusion of the center pillar 4 and the side sill 5 into the cabin 10 can be reduced. Particularly, when the upper portion 21 and the overlapping portion 22 is integrally molded in the pillar outer 41, the impact load of the side collision that has acted on the upper portion 21 is transmitted to the overlapping portion 22 at a high transmission efficiency, and is more positively transmitted to the side sill 5 as a torsion moment. As a result, it is possible to more positively suppress the occurrence of collapse in the closed cross-sectional shape of the side sill 5, particularly, in the side sill outer 15. On the other hand, by devising the arrangement such that the center pillar 4 does not reach as far as a lower end (the lower flange 155) of the side sill 5, the center pillar 4 does not become heavier than necessary, and it is possible to highly balance the improvement in the reinforcement effect of the side sill 5 by the lower portion shape of the center pillar 4 and the suppression of increase in the weight of the center pillar 4.

Additionally, in the present embodiment, a member for connecting the inner surface of the upper portion 21 of the pillar outer 41 to the upper surface 152*a* of the upper wall 152 of the side sill outer 15 is not arranged. More specifically, a member connected to the upper surface 152*a* of the upper wall 152 of the side sill outer 15 does not exist in each of the inner surface of the front wall 412 in the upper portion 21 of the pillar outer 41, the inner surface of the side wall 413, and the inner surface of the rear wall 414. With such a configuration, in the present embodiment, in the closed cross-sectional shape formed by the pillar outer 41 and the pillar inner 42 of the center pillar 4 above the side sill 5, the space between the inner surface of the upper portion 21 of the pillar outer 41 and the upper surface 152*a* of the upper wall 152 of the side sill outer 15 is directly connected. Note that JP2016-94064A discloses a configuration in which a load transmission member is arranged that connects an upper surface (corresponding to the upper surface 152*a* in the present embodiment) of a side sill outer to an inner surface (corresponding to the inner surface of the side wall 413 in the present embodiment) of a side wall of an upper portion of a pillar outer. Since this load transmission member exists, the impact load that acts on a center pillar due to a side collision is transmitted from the load transmission member to a floor cross member through a side sill, and is received by the floor cross member. That is, in the configuration described in JP2016-94064A, since the load transmission member exists, the deformation of the side sill due to a torsion moment at the time of a side collision is suppressed. In this manner, the configuration described in JP2016-94064A transmits the impact load due to a side collision by such an operation that prevents the impact absorption operation (impact absorption by transmission of the torsion moment to the side sill) in the present embodiment, and the impact absorption method at the time of a side collision is completely different from the configuration of the present embodiment. In the present embodiment, since the load transmission member that connects the upper surface 152*a* of the side sill outer 15 to the inner surface of the upper portion 21 in the pillar outer 41 is not arranged, and the overlapping portion 22 is provided, the overlapping portion 22 applies a torsion moment to the side sill 5 due to the impact load that is input to the overlapping portion 22 at the time of a side collision. It can be said that the overlapping portion 22 is a torsion moment application portion that receives the impact load due to a side collision, thereby applying, to the side sill 5, a torsion moment that twists and deforms the side sill 5.

In the present embodiment, the lower end 224*b* of the lower wall 224 contacts the bottom surface 154*a* of the lower wall 154 of the side sill outer 15.

In the present embodiment, the lower end 224*b* of the lower wall 224 is arranged throughout the entire range in the front and rear direction X in which the overlapping portion 22 of the center pillar 4 exists. That is, the lower end 224*b* of the overlapping portion 22 is a linear end portion along the vertical direction Z. With this configuration, the vehicle body 1 can receive the load transmitted from the center pillar 4 to the side sill 5 at the time of a side collision as a torsion moment over the entire portion in the front and rear direction X in which the overlapping portion 22 is arranged. Therefore, it is possible to more positively suppress the occurrence of collapse in the closed cross-sectional shape of the side sill 5, particularly, in the side sill outer 15.

Note that the lower end 224*b* of the lower wall 224 may include a raised portion that is inclined in the front and rear direction X when viewed in a side view.

It is preferable that the lower end 224*b* of the lower wall 224 is arranged between the lower end 156*b* of the R portion 156 and the upper end 157*a* of the R portion 157 in the lower wall 154 of the side sill outer 15. It is more preferable that, in the width direction Y, the position of the lower end 224*b* of the lower wall 224 is at a position that is closer to the cabin 10 than the middle position of the lower wall 224. In the present embodiment, the lower end 224*b* of the lower wall 224 is located in the upper end 157*a* of the R portion 157.

With the configuration described above, in the present embodiment, the lower end 224*b* of the lower wall 224, serving as the lower end of the overlapping portion 22, is arranged at a position closer to the lower flange 155 of the outer surface 153*a* of the side wall 153 and the lower flange 155 of the side sill outer 15 in the vehicle width direction Y, and is fixed to the bottom surface 154*a* of the lower wall 154 of the side sill outer 15 at this position closer to the lower flange 155. According to this configuration, by slightly extending the position of the lower end 224*b* of the lower wall 224 downward from the side wall 153 of the side sill outer 15, the collapse suppression effect of the closed cross-sectional shape of the side sill 5 at the time of a side collision can be greatly increased and, moreover, the increase in the weight of the overlapping portion 22 can be minimized.

In the present embodiment, the side sill outer 15 and the overlapping portion 22 of the center pillar 4 are fixed to each other by welding at two portions in the vertical direction Z. Specifically, at a middle position 153*b* of the side wall 153 of the side sill outer 15 in the vertical direction Z, the side wall 153 of the side sill outer 15 and the side wall 223 of the overlapping portion 22 of the center pillar 4 are fixed to each other by welding. Further, the upper end 157*a* of the R portion 157 in the lower wall 154 of the side sill outer 15 and the lower end 224*b* of the lower wall 224 of the overlapping portion 22 are fixed to each other by welding. Note that the welding portions between the side sill outer 15 and the overlapping portion 22 in the vertical direction Z are not limited to the examples described above.

In the present embodiment, the overlapping portion 22 includes a front portion 226 projecting forward with respect to the upper portion 21 (a center position X0), an intermediate portion 227 continuous with the upper portion 21 in the vertical direction Z, and a rear portion 228 projecting rearward with respect to the upper portion 21.

The front portion 226 and the rear portion 228 have the upper flange 221, the upper wall 222, the side wall 223, and the lower wall 224, which have been described above. On the other hand, the intermediate portion 227 does not include the upper flange 221 and the upper wall 222, but includes the side wall 223 and the lower wall 224. The side wall 223 of the intermediate portion 227 is continuous with the side wall 413 of the pillar outer 41 of the upper portion 21.

With the configuration described above, in the front and rear direction X, the overlapping portion 22 continuously covers the external surface of the side sill 5 from the outer surface 153*a* of the side wall 153 of the side sill 5 to the bottom surface 154*a* of the lower wall 154 at the center position that serves as the center of the lower end 224*b* of the center pillar 4 in the front and rear direction X.

Preferably, the overlapping portion 22 contacts both the outer surface 153*a* of the side wall 153 of the side sill outer 15, and the bottom surface 154*a* of the lower wall 154. With this configuration, the coupling strength between the side sill 5 and the center pillar 4 can be further increased.

Next, an example of a method for designing the height position of the lower end 224*b* of the overlapping portion 22 will be described.

The height position of the lower end 224*b* of the lower wall 224 of the overlapping portion 22 is set through, for example, the following positioning step. Specifically, in the positioning step, a side collision test is performed on each of a plurality of types of vehicle bodies 1 (the center pillars 4 and the side sills 5) that have different height positions of the lower end 224*b*, and the position of the lower end 224*b* is determined on the basis of the result of the side collision and the weight of the center pillar 4 according to the position of the lower end 224*b* of the overlapping portion 22. The side collision test is performed in accordance with, for example, the Euro NCAP (European New Car Assessment Programme). This side collision test is performed by, for example, creating a model of the vehicle body 1 on a computer, and performing a side collision test on this model.

The evaluation of a side collision is performed as follows, for example. Specifically, first, the maximum amount of intrusion of the vehicle body 1 toward the cabin 10 according to the position of the lower end 224*b* of the overlapping portion 22 is calculated. Next, for each position of the lower end 224*b* of the overlapping portion 22, the decreasing rate of the maximum amount of intrusion and the weight increasing rate of the center pillar 4 with the change in the position of the lower end 224*b* are calculated. Then, for example, the height position of the lower end 224*b* is searched at which the maximum amount of intrusion is a certain standard or less, and at which the decreasing rate of the maximum amount of intrusion/the weight increasing rate begins to converge to a constant value. Accordingly, for example, a layout can be realized in which the lower end 224*b* extends along the bottom surface 154*a* of the lower wall 154 of the side sill outer 15, as described in the present embodiment.

In the present embodiment, a through-hole 229 is formed in the side wall 223 in the rear portion 228 of the overlapping portion 22. Additionally, a through-hole 158 is formed in the side wall 153 of the side sill outer 15 at a portion that overlaps with the through-hole 229 formed in the rear portion 228 of the overlapping portion 22.

In the present embodiment, a front end edge 226*a* of the front portion 226 of the overlapping portion 22 and a rear end edge 228*a* of the rear portion 228 are located on a flat surface perpendicular to the front and rear direction X.

In the present embodiment, the center position in the front and rear direction X of the overlapping portion 22 of the center pillar 4 at the height position of the upper surface 152*a* of the upper wall 152 of the side sill 5 is defined as X0. Additionally, the position of the front end edge 226*a* of the overlapping portion 22 arranged between the center position X0 to the front restricting position X2 (X2F) is defined as a front end edge position X1 (X1F). In addition, the distance from the center position X0 to the front restricting position X2 (X2F) in the front and rear direction X is defined as L0 (L0F). Further, the distance from the center position X0 to the front end edge position X1 in the front and rear direction X is defined as L1.

In the present embodiment, L1F/L0F, which is the ratio of the distances L0F and L1F, is set to 0.36≤L1F/L0F≤0.48. By setting the ratio L1F/L0F to 0.36 or more, the length (overlap allowance) of the overlapping portion between the front portion 226 of the overlapping portion 22 of the center pillar 4 and the side sill outer 15 in the front and rear direction X can be made sufficiently large. Accordingly, at the time of a side collision, in the area in which the overlapping portion 22 is arranged, the center pillar 4 and the side sill 5 are integrally rotated (rotation seen from the front and rear direction X). Therefore, a torsion moment is not input to the side sill 5, shear buckling of the upper wall 152 of the side sill 5 does not occur, and even if the shear buckling occurs, it is slight. Further, since the overlapping portion 22 of the center pillar 4 overlaps with the side sill 5, the torsional rigidity becomes high, so that the torsion angle of the side sill 5 can be reduced. Additionally, even when a portion of the side sills 5 that is not overlapped with the overlapping portion 22 of the center pillar 4 is buckled, since deformation occurs that reduces the length of the portion in the longitudinal direction, the rotation angle (the rotation angle of the rotation seen from the front and rear direction) of the overlapping portion 22 is decreased. Therefore, the amount of intrusion of the side sill 5 toward the cabin side at the time of a side collision can be reduced. On the other hand, by setting L1F/L0F to 0.48 or less, the center pillar 4 does not become heavier than necessary. Therefore, it is possible to highly balance the improvement in the reinforcement effect of the side sill 5 by the overlapping portion 22 of the center pillar 4 and the suppression of increase in the weight of the center pillar 4. Note that, when L1F/L0F is set larger than 0.48, the decreasing rate of the amount of intrusion of the side sill 5 toward the cabin at the time of a side collision is hardly improved with respect to the weight increasing rate of the overlapping portion 22 of the center pillar 4. Therefore, when L1F/L0F is more than 0.48, it becomes difficult for the overlapping portion 22 to contribute to weight reduction of the vehicle body.

The lower limit of L1F/L0F may be 0.38, may be 0.40, or may be 0.42. Additionally, the upper limit of L1F/L0F may be 0.46, may be 0.44, or may be 0.42.

Additionally, in the present embodiment, in the front and rear direction X, the distance L1 (L1F) from the center position X0 to the front end position X1 (X1F) of the overlapping portion 22 and the distance L1 (L1R) from the center position X0 to the rear end position X1 (X1R) of the overlapping portion 22 are substantially the same. "Substantially the same" in this case refers to, for example, that the distance ratio L1F/L1R is 0.9≤L1F/L1R≤1.1. According to this configuration, at the time of a side collision, the impact load can be received by the front portion 226 and the rear portion 228 of the overlapping portion 22 in a well-balanced manner. As a result, it is possible to suppress the occurrence of bias between the amount of intrusion of the vehicle body 1 toward the cabin 10 in the front side of the upper portion 21 of the center pillar 4, and the amount of intrusion of the vehicle body 1 toward the cabin 10 in the rear side of the upper portion 21. Accordingly, at the time of a side collision, the maximum value of the amount of intrusion of the side sill 5 toward the cabin 10 can be further decreased.

Note that the distance ratio L1F/L1R may not be 0.9≤L1F/L1R≤1.1.

It is preferable that at least one of the front portion 226 of the overlapping portion 22 and the rear portion 228 of the overlapping portion 22 is arranged so as to be overlapped with the position of the floor cross member 8 in the front and rear direction X. In the present embodiment, the front portion 226 of the overlapping portion 22 is aligned with the floor cross member 8 in the width direction Y, and thus is overlapped with the position of the floor cross member 8 in the front and rear direction X. It is preferable that the position of the front portion 226 of the overlapping portion 22 is overlapped with the entire area of the floor cross member 8 in the front and rear direction X. According to this configuration, at the time of a side collision, since the overlapping portion 22 and the floor cross member 8 firmly sandwich the side sill 5, the torsional deformation of the side sill 5 can be more positively suppressed. As a result, the amount of intrusion of the side sill 5 toward the cabin 10 at the time of a side collision can be further reduced.

Next, an example of a method for designing the front-and-rear-direction position of the front end edge 226*a* of the overlapping portion 22 will be described.

The front-and-rear-direction position of the front end edge 226*a* of the overlapping portion 22 is set through, for example, the following positioning step. Specifically, in the positioning step, a side collision test is performed on each of a plurality of types of vehicle bodies 1 that have different ratios L1/L0, where L1/L0 is the ratio between the distance L0 from the center position X0 to the front restricting position X2 (X2F) and the distance L1 from the center position X0 to the front end edge position X1F, and the front end edge position X1F is determined on the basis of the result of the side collision and the weight of the center pillar 4 according to the front end edge position X1F. The side collision test is performed in accordance with, for example, the Euro NCAP described above. This side collision test is performed by, for example, creating a model of the vehicle body 1 on a computer, and performing a side collision test on this model in a manner similar to that described above.

A method for designing the front-and-rear-direction position of the rear end edge 228*a* of the overlapping portion 22 may also be performed in a manner similar to that described above. That is, in a positioning step, a side collision test is performed on each of a plurality of types of vehicle bodies 1 that have different ratios L1/L0, where L1/L0 is the ratio between the distance L0 from the center position X0 to the rear restricting position X2 (X2R) and the distance L1 from the center position X0 to the rear end edge position X1R, and the rear end edge position X1R can be determined on the basis of the result of the side collision and the weight of the center pillar 4 according to the rear end edge position X1R.

The evaluation of a side collision is performed as follows, for example. Specifically, first, the maximum amount of intrusion of the vehicle body 1 toward the cabin 10 is calculated for each of a plurality of L1/L0. Next, the decreasing rate of the maximum amount of intrusion and the weight increasing rate of the center pillar 4 with the change in L1/L0 are calculated. Then, for example, the value of L1/L0 is searched at which the maximum amount of intrusion is a certain standard or less, and at which the decreasing rate of the maximum amount of intrusion/the weight increasing rate begins to converge to a constant value. Accordingly, for example, a layout can be realized in which the front end edge position X1F is 0.36≤L1/L0≤0.48, as described in the present embodiment. In this manner, the front end edge position X1F is determined on the basis of the result of the side collision and the weight of the center pillar 4 with respect to L1/L0.

The embodiment of the present invention has been described above. However, the present invention is not limited to the embodiment described above. The present invention can be modified in various ways within the scope described in the claims. Note that, hereinafter, a description will be mainly given of configurations that are different from the aforementioned embodiment and modifications, similar configurations are denoted by similar numerals, and a detailed description will be omitted.

Figure 5:
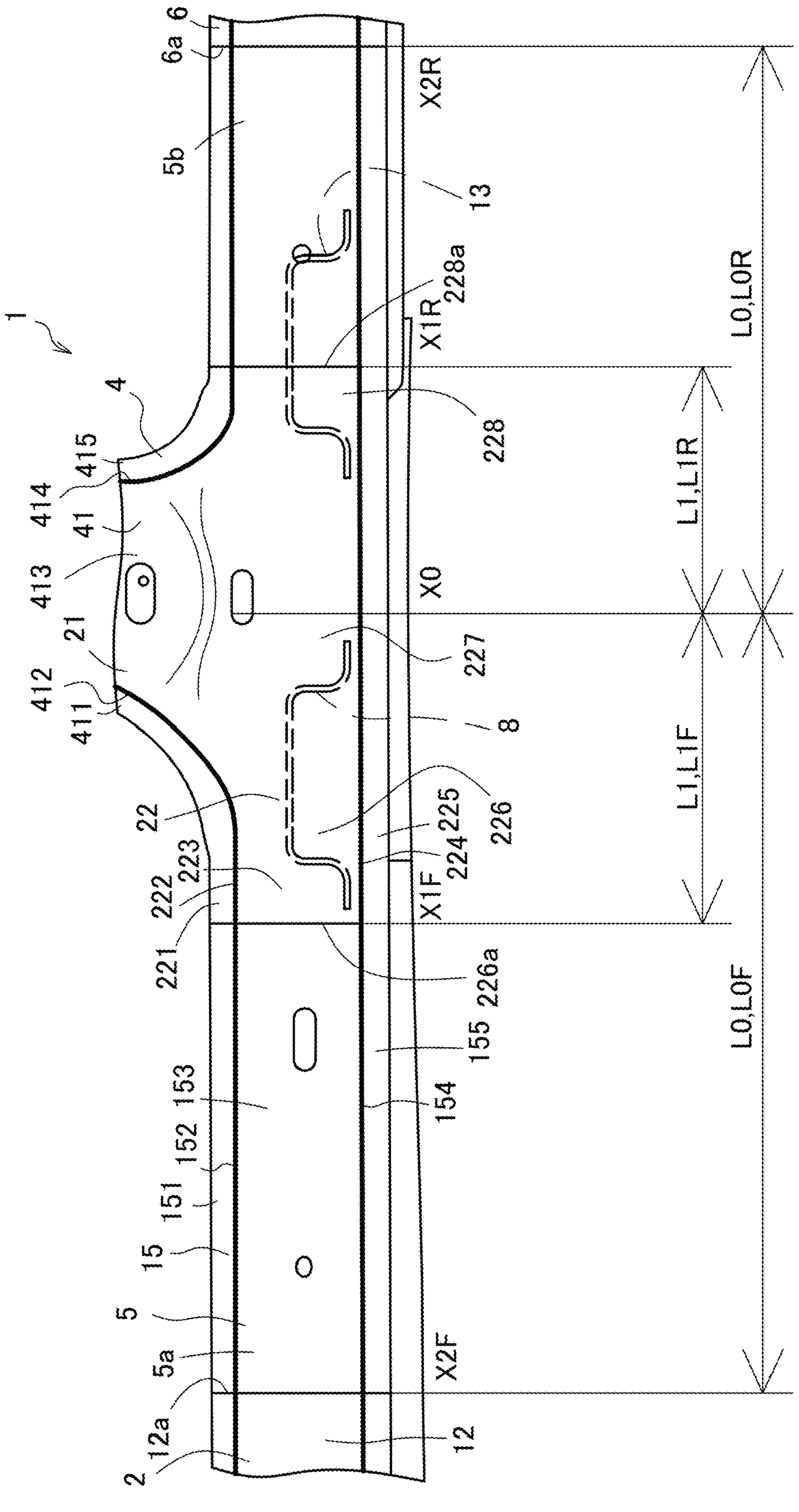
FIG. 5 is a diagram illustrating a modification of the present invention.

FIG. 5 is a diagram illustrating a modification of the present invention. In the modification illustrated in FIG. 5, the position of the rear end edge 228*a* of the overlapping portion 22 arranged between the center position X0 of the center pillar 4 in the front and rear direction X and the rear restricting position X2 (X2R) is defined as the rear end edge position X1 (X1R). Additionally, the distance from the center position X0 to the rear restricting position X2 (X2R) in the front and rear direction X is defined as L0 (L0R). In addition, the distance from the center position X0 to the rear end edge position X1R in the front and rear direction X is defined as L1 (L1R).

In the present modification, L1R/L0R, which is the ratio between the distances L0R and L1R, is set to 0.36≤L1R/L0R≤0.48. By setting the ratio L1R/L0R to 0.36 or more, the length (overlap allowance) of the overlapping portion between the rear portion 228 of the overlapping portion 22 of the center pillar 4 and the side sill outer 15 in the front and rear direction X can be made sufficiently large. Accordingly, for the reason similar to that described in the embodiment described above, the amount of intrusion of the side sill 5 toward the cabin at the time of a side collision can be reduced. On the other hand, by setting L1R/L0R to 0.48 or less, the center pillar 4 does not become heavier than necessary. Therefore, it is possible to highly balance the improvement in the reinforcement effect of the side sill 5 by the overlapping portion 22 of the center pillar 4 and the suppression of increase in the weight of the center pillar 4. Note that, when L1R/L0R is set larger than 0.48, the decreasing rate of the amount of intrusion of the side sill 5 toward the cabin at the time of a side collision is hardly improved with respect to the weight increasing rate of the overlapping portion 22 of the center pillar 4. Therefore, when L1R/L0R is more than 0.48, it becomes difficult for the overlapping portion 22 to contribute to weight reduction of the vehicle body.

The lower limit of L1R/L0R may be 0.38, may be 0.40, or may be 0.42. Additionally, the upper limit of L1R/L0R may be 0.46, may be 0.44, or may be 0.42.

Note that it is sufficient that at least one of 0.36≤L1F/L0F≤0.48 and 0.36≤ L1R/L0R≤0.48 is satisfied.

Additionally, in the present modification, in addition to that the front portion 226 of the overlapping portion 22 is arranged so as to be overlapped with the position of the floor cross member 8 in the front and rear direction X, the rear portion 228 of the overlapping portion 22 is arranged so as to be overlapped with the position of a floor cross member 13 in the front and rear direction X. The rear portion 228 of the overlapping portion 22 is aligned with the floor cross member 13 in the width direction Y, and thus is overlapped with the position of the floor cross member 13 in the front and rear directions X. It is more preferable that the position of the rear portion 228 of the overlapping portion 22 is overlapped with the entire area of the floor cross member 13 in the front and rear direction X. According to this configuration, at the time of a side collision, since the overlapping portion 22 and the floor cross members 8 and 13 firmly sandwich the side sill 5 at two portions separated in the front and rear direction X, the torsional deformation of the side sill 5 can be more positively suppressed. As a result, the amount of intrusion of the vehicle body 1 toward the cabin 10 at the time of a side collision can be further reduced.

Note that, in the present modification, the front portion 226 may not be arranged so as to be overlapped with the position of the floor cross member 8 in the front and rear direction X.

Additionally, in the aforementioned embodiment and modification, when the lower end 224*b* of the overlapping portion 22 extends along the bottom surface 154*a* of the lower wall 154 of the side sill outer 15, the condition 0.36≤L1/L0≤0.48 may not be satisfied.

Additionally, in the aforementioned embodiment and modification, when the condition 0.36≤L1/L0≤0.48 is satisfied, the lower end 224*b* of the overlapping portion 22 may not extend along the bottom surface 154*a* of the lower wall 154 of the side sill outer 15, and may extend along the upper wall 152, the side wall 153, or the lower flange 155.

EXAMPLE

A model of the vehicle body 1 described in the embodiment (FIG. 1 to FIG. 4) was created by a computer. The specification of the model of the vehicle body 1 is as follows.

Thickness of the side sill 5: 1.0 (mm)

Thickness of the upper portion 21 of the center pillar 4: when the front end edge position X1F and the rear end edge position X1R of the overlapping portion 22 in the front and rear direction X, which will be described later, are of a type 000, it is 2.03 (mm) in the vicinity of a connection portion with the roof pillar 3 (in the vicinity of an upper end portion) and in the vicinity of a connection portion with the overlapping portion 22 (in the vicinity of a lower end portion), and it is 2.45 (mm) in the intermediate portion in the vertical direction Z. Additionally, when the front end edge position X1F and the rear end edge position X1R of the overlapping portion 22 in the front and rear direction X, which will be described later, are of a type other than the type 000, it is 1.45 (mm) in the vicinity of the connection portion with the roof pillar 3 (in the vicinity of the upper end portion) and in the vicinity of the connection portion with the overlapping portion 22 (in the vicinity of the lower end portion), and it is 1.75 (mm) in the intermediate portion in the vertical direction Z.

Thickness of the overlapping portion 22 of the center pillar 4: when the front end edge position X1F and the rear end edge position X1R of the overlapping portion 22 in the front and rear direction X, which will be described later, are of the type 000, it is 2.03 mm, and in the case of a type other than the type 000, it is 1.45 mm.

Young's modulus of the side sill 5 and the center pillar 4: 206 (Gpa)

Poisson's ratio of the side sill 5 and the center pillar 4: 0.3

Bending strength of the side wall 153 of the side sill 5: 18864 (N·mm)

Figure 6:
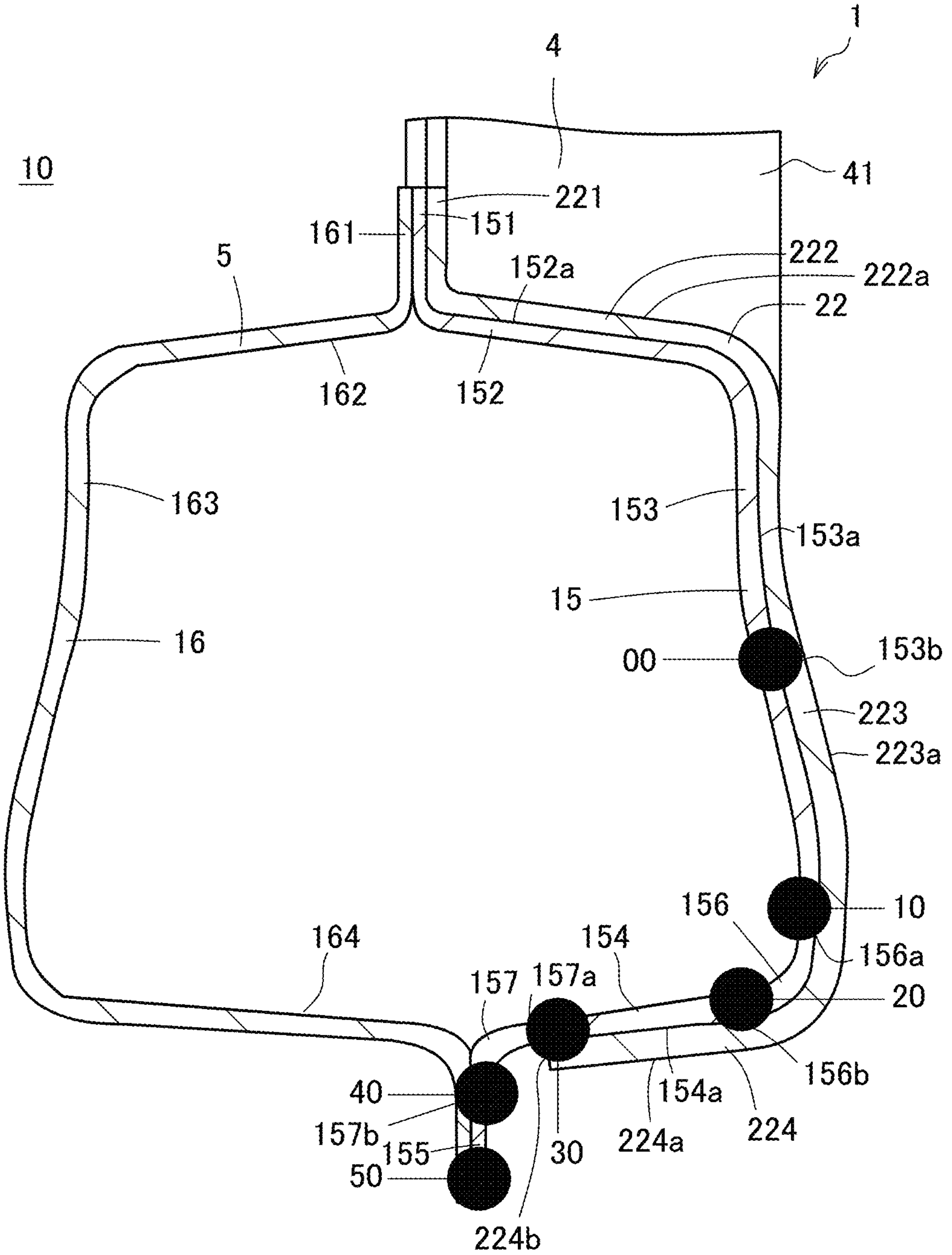
FIG. 6 is a diagram for describing the position of a lower end of an overlapping portion in an example.

Distance from the center position X0 to the front restricting position X2 (X2F) in the front and rear direction X: 762 mm Additionally, six types (six types, i.e., 00, 10, 20, 30, 40, and 50) were set for the height position of the lower end 224*b* in the overlapping portion 22 of the center pillar 4 in the vertical direction Z. As illustrated in FIG. 6, the height position of the lower end 224*b* in each type is as follows.

Note that FIG. 6 is a diagram for describing the position of the lower end 224*b* of the overlapping portion 22 in an example.

00: the center of the side wall 153 in the vertical direction Z

10: the upper end 156*a* of the R portion 156

20: the lower end 156*b* of the R portion 156

30: the upper end 157*a* of the R portion 157

40: the lower end 157*b* of the R portion 157

50: the lower end of the lower flange 155

Additionally, five types (000, 0001, 002, 003, 004) were set for the front end edge position X1F and the rear end edge position X1R of the overlapping portion 22 in the front and rear direction X. In each type, the length ratio L1/L0 in the vertical direction Z is as follows.

000: L1/L0 (L1F/L0F) of the front end edge 226*a* of the overlapping portion 22: 0.32
  L1/L0 (L1R/L0R) of the rear end edge 228*a* of the overlapping portion 22: 0.55

001: L1/L0 (L1F/L0F) of the front end edge 226*a* of the overlapping portion 22: 0.36
  L1/L0 (L1R/L0R) of the rear end edge 228*a* of the overlapping portion 22: 0.62

002: L1/L0 (L1F/L0F) of the front end edge 226*a* of the overlapping portion 22: 0.40
  L1/L0 (L1R/L0R) of the rear end edge 228*a* of the overlapping portion 22: 0.68

003: L1/L0 (L1F/L0F) of the front end edge 226*a* of the overlapping portion 22: 0.48
  L1/L0 (L1R/L0R) of the rear end edge 228*a* of the overlapping portion 22: 0.82

004: L1/L0 (L1F/L0F) of the front end edge 226*a* of the overlapping portion 22: 0.51
  L1/L0 (L1R/L0R) of the rear end edge 228*a* of the overlapping portion 22: 0.89

For each of 6×5=30 types of combinations of the six types (00, 10, 20, 30, 40, 50) of the lower end positions of the overlapping portion 22, and the five types (000, 001, 002, 003, 004) of the front/rear end positions of the overlapping portion 22, the amount of intrusion (the amount of deformation) of the vehicle body 1 toward the cabin 10 at the time when a side collision occurs to a vehicle body was calculated by computer simulation. Side collision conditions were set in conformity with the Euro NCAP (European New Car Assessment Programme). Specifically, the maximum value of the amount of intrusion of the vehicle body 1 toward the cabin 10 at the time when a moving barrier collided with the overlapping portion 22 of the vehicle body 1 at 50 km/h was calculated.

The calculation locations of the maximum amount of intrusion (mm) were three locations in the vertical direction Z. Specifically, the following measurement height positions 1 to 3 were used. The measurement height positions 1 to 3 are illustrated in FIG. 1.

Measurement height 1: height position of 180 mm from the ground

Measurement height 2: height position of 380 mm from the ground

Measurement height 3: height position of 680 mm from the ground

<Regarding Lower End Position of Overlapping Portion of Center Pillar>

The result is illustrated in FIG. 7.

Figure 7A:
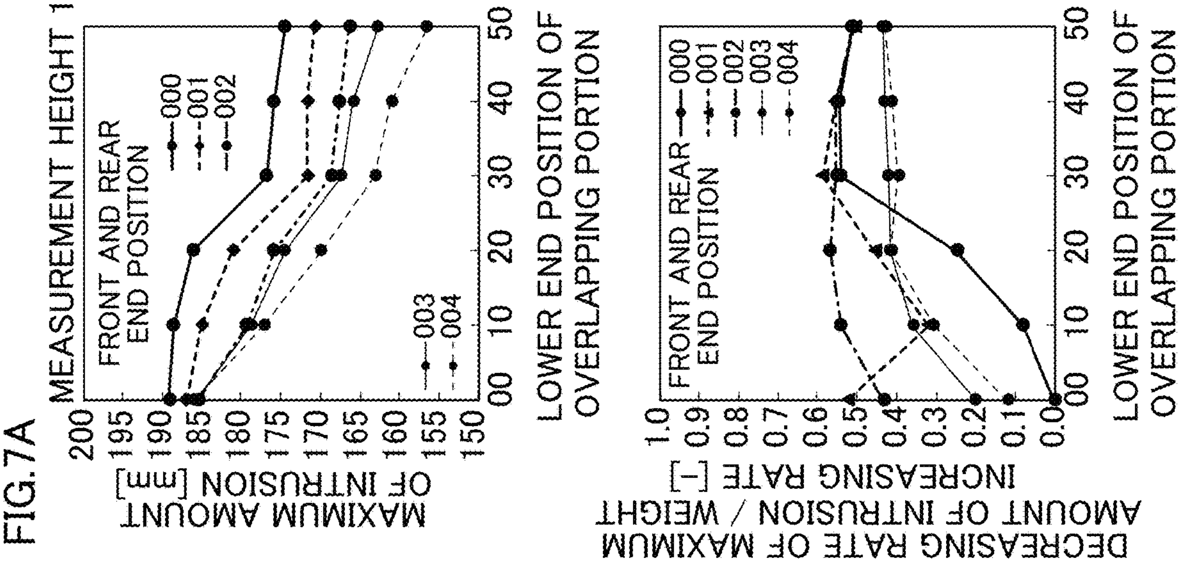
FIG. 7 An upper graph in FIG. 7A illustrates the maximum amount of intrusion at a measurement height 1 for each of six types of lower end positions of the overlapping portion, where a horizontal axis represents the type of each lower end position, and a vertical axis represents the value of the maximum amount of intrusion. A lower graph in FIG. 7A illustrates the decreasing rate of the maximum amount of intrusion/the weight increasing rate at the measurement height 1 for each of the six types of the lower end positions of the overlapping portion, where a horizontal axis represents the type of each lower end position, and a vertical axis represents the decreasing rate of the maximum amount of intrusion/the weight increasing rate. An upper graph in FIG. 7B is a graph illustrating the maximum amount of intrusion at a measurement height 2 for each of the six types of the lower end positions of the overlapping portion. A lower graph in FIG. 7B is a graph illustrating the decreasing rate of the maximum amount of intrusion/the weight increasing rate at the measurement height 2 for each of the six types of the lower end positions of the overlapping portion. An upper graph in FIG. 7C is a graph illustrating the maximum amount of intrusion at a measurement height 3 for each of the six types of the lower end positions of the overlapping portion. A lower graph in FIG. 7C is a graph illustrating the decreasing rate of the maximum amount of intrusion/the weight increasing rate at the measurement height 3 for each of the six types of the lower end positions of the overlapping portion.

An upper graph in FIG. 7A illustrates the maximum amount of intrusion at the measurement height 1 for each of the lower end positions of the six types of overlapping portions 22, where a horizontal axis represents the type of each lower end position, and a vertical axis represents the value of the maximum amount of intrusion. A lower graph in FIG. 7A illustrates the decreasing rate of the maximum amount of intrusion/the weight increasing rate at the measurement height 1 for each of the lower end positions of the six types of overlapping portions 22, where a horizontal axis represents the type of each lower end position, and a vertical axis represents the decreasing rate of the maximum amount of intrusion/the weight increasing rate.

Figure 7B:
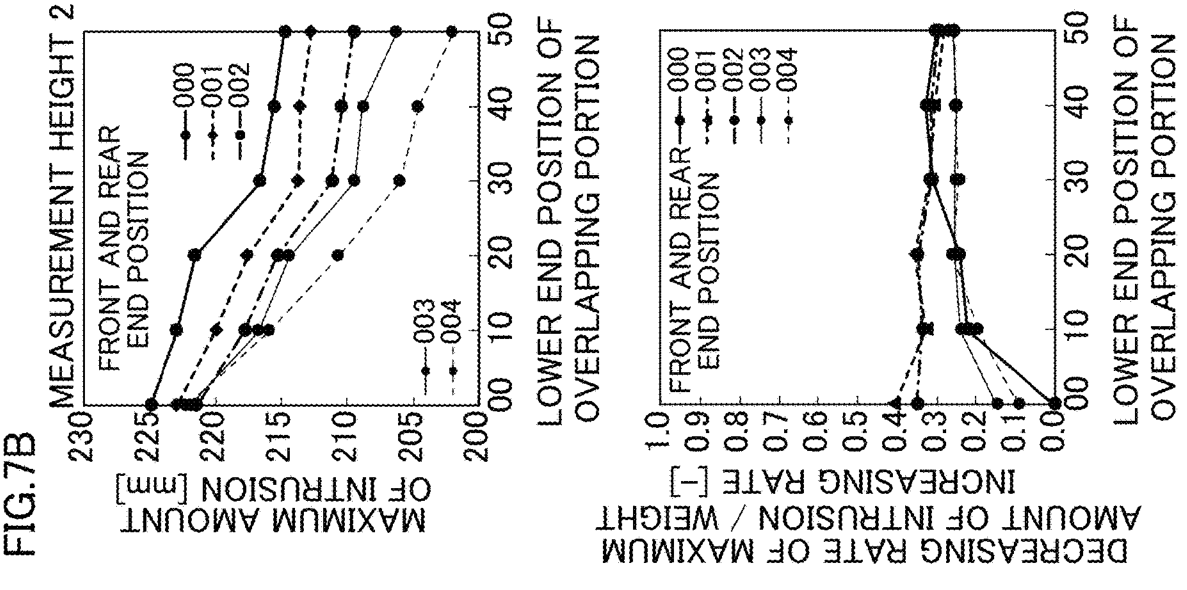
Figure 7C:
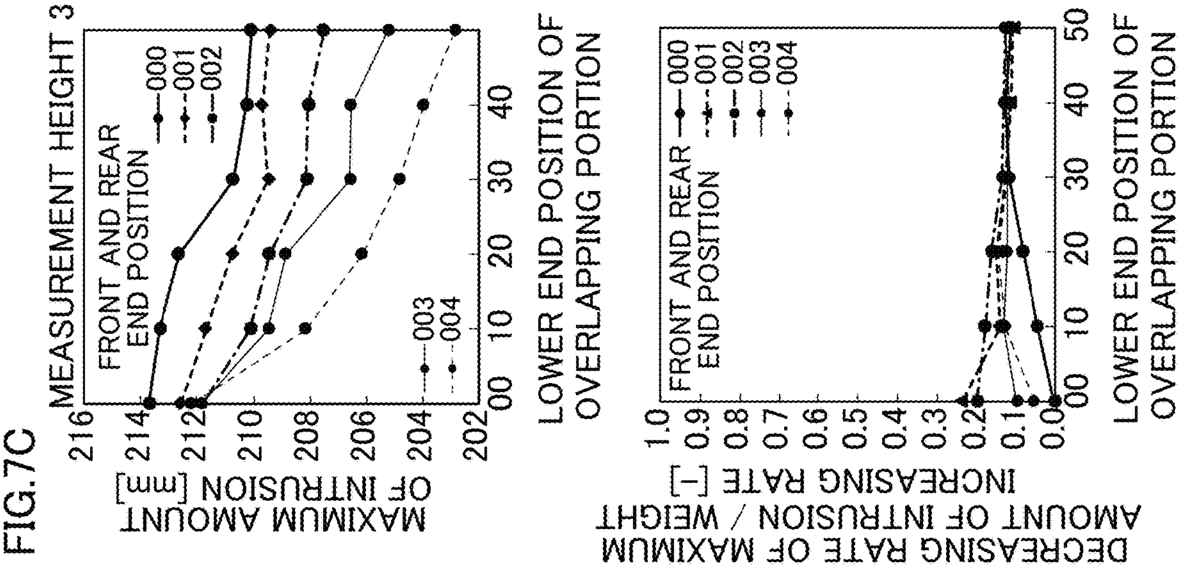

An upper graph in FIG. 7B is a graph illustrating the maximum amount of intrusion at the measurement height 2 for each of the lower end positions of the six types of overlapping portions 22. A lower graph in FIG. 7B is a graph illustrating the decreasing rate of the maximum amount of intrusion/the weight increasing rate at the measurement height 2 for each of the lower end positions of the six types of overlapping portions 22. An upper graph in FIG. 7C is a graph illustrating the maximum amount of intrusion at the measurement height 3 for each of the lower end positions of the six types of overlapping portions 22. A lower graph in FIG. 7C is a graph illustrating the decreasing rate of the maximum amount of intrusion/the weight increasing rate at the measurement height 3 for each of the lower end positions of the six types of overlapping portions.

The decreasing rate of the maximum amount of intrusion refers to the rate of the maximum amount of intrusion in cases in which each lower end position is 10 to 50 to the maximum amount of intrusion in a case in which the lower end position of the overlapping portion 22 is 00. Additionally, the weight increasing rate refers to the rate of the weight of the center pillar 4 in cases in which each lower end position is 10 to 50 to the weight of the center pillar 4 in a case in which the lower end position of the overlapping portion 22 is 00.

As illustrated in the upper graphs in FIG. 7A to FIG. 7C, respectively, the lower the position of the lower end 224*b* of the overlapping portion 22, the smaller the maximum amount of intrusion. This is because, since the center pillar 4 and the side sill 5 are integrally rotated in the portion in which the overlapping portion 22 is arranged, a torsion moment is not input or is small, and shear buckling of the upper wall 152 of the side sill outer 15 hardly occurs. Further, since the torsional rigidity of the portion in which the overlapping portion 22 is arranged becomes high, the torsion angle of the side sill 5 can be reduced. However, when the position of the lower end 224*b* is 30 to 50, there is almost no difference in the amount of intrusion. On the other hand, as illustrated in the lower graphs in FIG. 7A to FIG. 7C, respectively, when the height position of the lower end 224*b* of the overlapping portion 22 is 0 to 20, the increase in the decreasing rate of the maximum amount of intrusion/the weight increasing rate is large, and the degree of the decrease in the maximum amount of intrusion relative to the increase in the weight of the overlapping portion 22, that is, anti-side collision performance, is improved. On the other hand, when the height position of the lower end 224*b* of the overlapping portion 22 is more than 30, the decreasing rate of the maximum amount of intrusion/the weight increasing rate substantially converges to a constant value, and there was no benefit of increasing the size of the overlapping portion 22. In this manner, it has been proved that, when the lower end 224*b* of the overlapping portion 22 is at a position between 20 to 30, that is, extends along the bottom surface 154*a* of the lower wall 154 of the side sill outer 15, the balance between the anti-side collision performance and the suppression of increase in the weight of the center pillar 4 is extremely excellent.

<Regarding Front and Rear Direction Length of Overlapping Portion of Center Pillar>

The result is illustrated in FIG. 8.

Figure 8A:
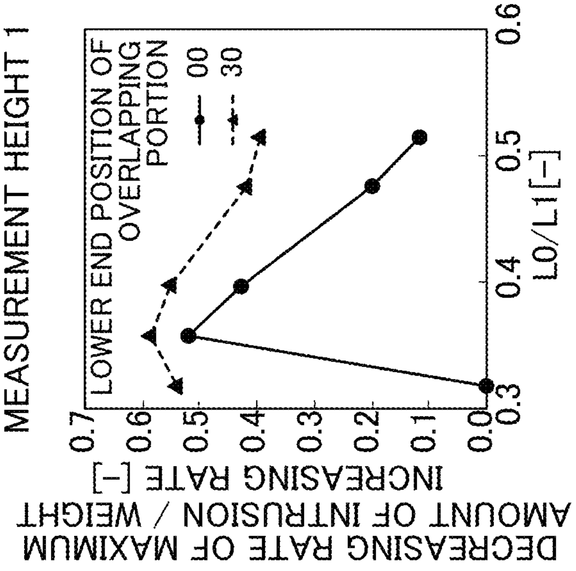
FIG. 8 A graph in FIG. 8A is a graph illustrating the relationship between the length ratio L1/L0 and the decreasing rate of the maximum amount of intrusion/the weight increasing rate for each of two types of lower end positions 00 and 30 of the overlapping portion at the measurement height 1. A graph in FIG. 8B is a graph illustrating the relationship between the length ratio L1/L0 and the decreasing rate of the maximum amount of intrusion/the weight increasing rate for each of the two types of the lower end positions 00 and 30 of the overlapping portion at the measurement height 2. A graph in FIG. 8C is a graph illustrating the relationship between the length ratio L1/L0 and the decreasing rate of the maximum amount of intrusion/the weight increasing rate for each of the two types of the lower end positions 00 and 30 of the overlapping portion at the measurement height 3.

A graph in FIG. 8A is a graph illustrating the relationship between the length ratio L1/L0 and the decreasing rate of the maximum amount of intrusion/the weight increasing rate for each of the two types of lower end positions 00 and 30 of the overlapping portion at the measurement height 1.

Figure 8B:
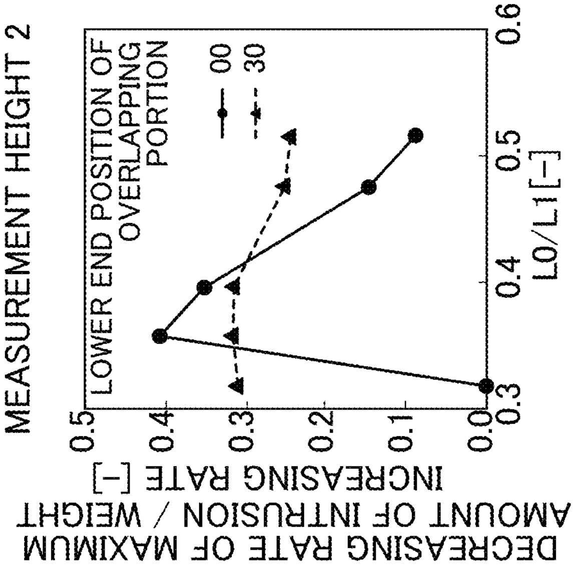

A graph in FIG. 8B is a graph illustrating the relationship between the length ratio L1/L0 and the decreasing rate of the maximum amount of intrusion/the weight increasing rate for each of the two types of the lower end positions 00 and 30 of the overlapping portion at the measurement height 2. A graph in FIG. 8C is a graph illustrating the relationship between the length ratio L1/L0 and the decreasing rate of the maximum amount of intrusion/the weight increasing rate for each of the two types of the lower end positions 00 and 30 of the overlapping portion at the measurement height 3.

Figure 8C:
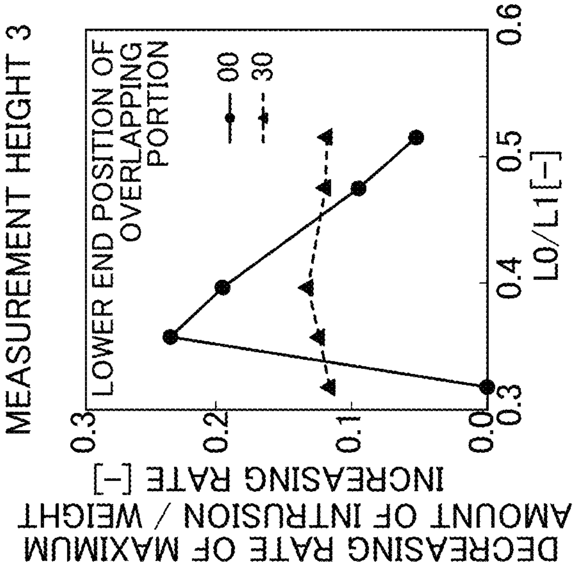

As illustrated in the graphs in FIG. 8A to FIG. 8C, respectively, the decreasing rate of the maximum amount of intrusion/the weight increasing rate is substantially linearly increased until L1/L0 becomes 0.36. Then, when L1/L0 is more than 0.36, the decreasing rate of the maximum amount of intrusion/the weight increasing rate is substantially linearly decreased. Then, when L1/L0 was more than 0.48, the decreasing rate of the maximum amount of intrusion/the weight increasing rate converged. In this manner, by setting 0.36≤L1/L0, the anti-side collision performance can be increased. Additionally, by setting L1/L0≤0.48, an excessive increase in the weight of the overlapping portion 22 can be suppressed. Therefore, it has been proved that, by setting 0.36≤L1/L0≤0.48, the balance between the anti-side collision performance and the suppression of increase in the weight of the center pillar 4 is extremely excellent.

Further, in the example, verification of L1/L0 (L1F/L0F) for the front portion 226 of the overlapping portion 22 was performed. However, in the vehicle body 1, the side sill 5 and the center pillar 4 have shapes that are generally symmetrical in the front and rear direction. From the above, it is obvious that excellent anti-side collision performance and weight efficiency can be realized by setting 0.36≤L1/L0≤0.48 (0.36≤L1R/L0R≤0.48) also for the rear portion 228 of the overlapping portion 22.

INDUSTRIAL APPLICABILITY

The present invention can be widely applied as a vehicle body structure and a method for designing a vehicle body structure.

REFERENCE SIGNS LIST

1 vehicle body
4 center pillar
5 side sill
5*a* front portion of side sill
5*b* rear portion of side sill
6 side sill rear (mating member)
8 floor cross member
12 pillar lower (mating member)
13 floor cross member
21 upper portion
22 overlapping portion
152*a* upper surface
153*a* outer surface
154*a* bottom surface
226 front portion
226*a* front end of overlapping portion
228 rear portion
228*a* rear end of overlapping portion
X2 (X2F) restricting position (front restricting position)
X2 (X2R) restricting position (rear restricting position)
X front and rear direction
Y vehicle width direction
Z vertical direction

The invention claimed is:

1. A vehicle body structure, comprising:

a center pillar arranged along a vertical direction of a vehicle body; and a side sill that is connected to a lower portion of the center pillar, and that is arranged along a front and rear direction of the vehicle body, wherein the side sill has a closed cross-sectional shape including an upper surface, an outer surface arranged below the upper surface and faces outward in a width direction of the vehicle body, and a bottom surface arranged below the outer surface, a front portion and a rear portion of the side sill are regulated from being moved inward in the width direction of the vehicle body at a front restricting position and a rear restricting position by mating members included in the vehicle body, respectively, at least one of the front restricting position and the rear restricting position is specified as a predetermined restricting position X2, the center pillar includes an overlapping portion arranged so as to cover an external surface of the side sill at a portion connected to the side sill, and a center position of the center pillar in the front and rear direction at a height position of the upper surface is specified as X0, an end portion position in the front and rear direction of the overlapping portion arranged between the center position X0 and the predetermined restricting position X2 is specified as X1, a distance in the front and rear direction from the center position X0 to the predetermined restricting position X2 is specified as L0, and a distance in the front and rear direction from the center position X0 to the end portion position X1 is specified as L1, and a ratio L1/L0 between the distances is 0.36≤L1/L0≤0.48.

2. The vehicle body structure according to claim 1, wherein the overlapping portion includes a front end and a rear end, and in the front and rear direction, a distance from the center position X0 to a position of the front end of the overlapping portion and a distance from the center position X0 to a position of the rear end of the overlapping portion are substantially the same.

3. The vehicle body structure according to claim 1, wherein at least one of a front portion of the overlapping portion located in front of the center position X0, and a rear portion of the overlapping portion located behind the center position X0 is arranged so as to overlap with a position of a floor cross member of the vehicle body in the front and rear direction.

4. The vehicle body structure according to claim 1, wherein a thickness of the side sill is less than a thickness of the overlapping portion of the center pillar.

5. A method for designing a vehicle body structure, the vehicle body structure comprising:

a side sill arranged along a front and rear direction of a vehicle body; and a center pillar arranged along a vertical direction of the vehicle body, the center pillar including an overlapping portion arranged so as to cover an external surface of the side sill at a portion connected to the side sill, the method comprising:

when determining an end portion position of the overlapping portion in the front and rear direction, performing a side collision test for the center pillar and the side sill, and determining the end portion position on the basis of a result of the side collision and a weight of the center pillar according to the end portion position of the overlapping portion.

6. The method for designing a vehicle body structure according to claim 5, wherein the center pillar includes an upper portion arranged above the overlapping portion, the side sill is restricted from moving inward in a width direction of the vehicle body at a predetermined restricting position X2 by a mating member included in the vehicle body at a position advanced from the upper portion toward an end portion position X1, and the end portion position X1 is determined on the basis of the result of the side collision and the weight of the center pillar with respect to a ratio L1/L0 between a distance L0 from a center position X0 set to the overlapping portion below the upper portion to the restricted position X2 and a distance L1 from the center position X0 to the end portion position X1.

* * * * *